United States Patent [19]

Fong

[11] Patent Number: 4,885,870
[45] Date of Patent: Dec. 12, 1989

[54] PLANT CONTAINER

[76] Inventor: Hanry Fong, 3rd Floor, Flat 12, 82 Fu Yan Street, Kwun Tong, Kowloon, Hong Kong

[21] Appl. No.: 194,755

[22] Filed: May 17, 1988

[51] Int. Cl.$^4$ ............................................. A01G 27/00
[52] U.S. Cl. .......................................... 47/79; 47/81
[58] Field of Search .................. 47/79, 80, 81, 59, 63, 47/64

[56] References Cited

U.S. PATENT DOCUMENTS 3,137,969 6/1964 Sokol .................................... 47/79

FOREIGN PATENT DOCUMENTS 0240641 10/1987 European Pat. Off. .

Primary Examiner—Robert A. Hafer
Assistant Examiner—Sam Rimell
Attorney, Agent, or Firm—Jeffers, Hoffman & Niewyk

[57] ABSTRACT

A plant container has a pot (8) surrounded by a water reservoir (15) above a tray (12). When the water level in the tray drops, air can pass up through a vent pipe (18) to relieve a partial vacuum in the reservoir and allow water to drip through an outlet aperture (27) into the dish. To avoid water being forced out of the top of the tube (18) by air bubbles, a constriction is provided in a plug 20 at the bottom of the vent pipe (18) to restrict the size of the air bubbles entering the pipe.

15 Claims, 3 Drawing Sheets

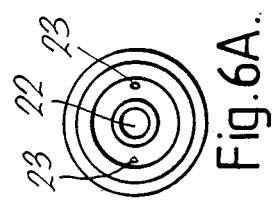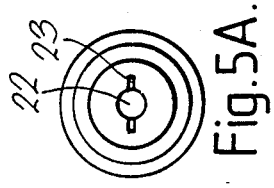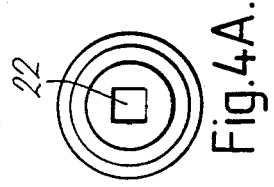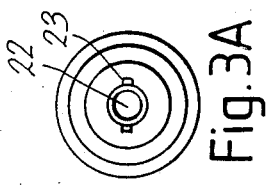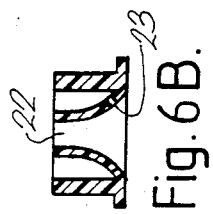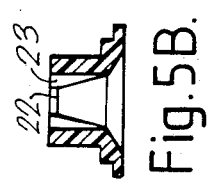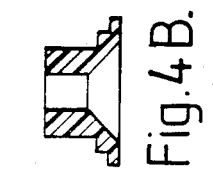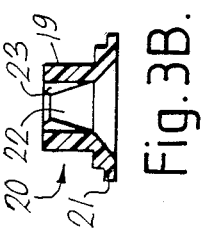

PLANT CONTAINER

It is common place for plant pots containing growing plants, to have an opening in their bottom and to be stood in a dish of water, so that the water may be drawn through the opening into the soil within the pot for nourishing the plant. However, the level of water must not be too high around the bottom of the pot, otherwise the water will rise to the same level within the pot and the soil within the pot will become undesirably saturated. It is consequently necessary continually to monitor the level of water in the dish and repeatedly to replenish the dish with small quantities of water as the water is used up by being drawn into the pot or by evaporation.

My EP-A-0240641 discloses a plant container comprising an inner wall forming a pot, which is arranged to contain a plant in a growing medium and which has water inlet means adjacent to its bottom; an outlet wall which surrounds the inner wall to provide between the walls a water reservoir; a dish which is located beneath the walls and which is capable of containing water at least up to the level of the water inlet means of the pot, the reservoir being provided adjacent to its top with a filling opening, which is provided with a removable air tight closure, and which is provided adjacent to its bottom with an outlet aperture opening into the dish; and a vent duct, a lower end of which opens through the bottom of the reservoir into the dish at a level above the water inlet means of the pot, the other upper end of the vent duct opening into an upper part of the reservoir; the arrangement being such that, in use, when the water in the tray is depleted so that the lower end of the vent duct is exposed, air can enter the reservoir through the vent duct, to release a vacuum above water within the reservoir and allow water to flow out of the reservoir through the outlet aperture into the tray. Such a container is hereinafter referred to as of the kind described.

Under equilibrium conditions, the water level in the vent duct will be substantially the same as that within the reservoir. If, as was the case with the container disclosed in my earlier EP specification, the cross-section of a pipe forming the vent duct is constant throughout the full length of the pipe, it happens that when the water level in the tray drops to expose the lower end of the pipe, bubbles of air of a size to fill the full cross-sectional area of the pipe rise up the pipe and force some of the water in the pipe out of the upper end of the pipe into the reservoir. Since the water in the pipe will have entered the pipe from the tray, and since the water in the tray may be contaminated, for example by soil, the water in the reservoir will gradually be become contaminated. This raises a number of problems not least of which is the danger that the tiny outlet aperture, through which water must pass from the reservoir into the dish, may become clogged.

In accordance with the present invention, a plant container of the kind described is characterised in that there is a constriction adjacent to the lower end of the vent duct so related to the internal dimensions of the vent duct that air cannot enter the vent duct so quickly that large bubbles can rise up the vent duct and force water out of the top of the vent duct into the reservoir.

As before, the vent duct may be provided by a pipe, the lower end of which is sealed to an opening in an annular bottom wall, which interconnects the lower ends of the inner and outer walls. In this case, the pipe may be sealed to the opening in the bottom wall by means of a tubular plug which is fitted in the opening in the bottom wall and has an upwardly projecting spigot over which the lower end of the pipe is fitted, the plug having a passageway providing the constriction.

The plug may include a primary cross-sectional area passageway for the upward flow of air into the pipe and at least one secondary cross-sectional area passageway, smaller than the primary cross-sectional area passageway, for the downward flow of water out of the pipe. This is advantageous because, when the vacuum is released by air passing up through the vent duct, the water level in the reservoir, and hence in the pipe will fall slightly and the excess water in the pipe has to be returned to the tray through the lower end of the duct. I have found that this is faciliated by the primary and secondary cross-sectional area passageways. These may be different parts of a common passage through the plug, for example the secondary cross-sectional area passageway may be one or more lateral branches of a primary passageway, or corners of a square passageway; or they may be separate passageways. In any case, the air bubbles, which tend to be spherical, will naturally pass up through the larger primary cross-sectional area passageway, without interfering with the drainage of water down through the secondary cross-sectional area passageway.

Any residual danger of water being forced out of the upper end of the vent duct can in practice be overcome by providing in addition a constriction at the upper of the vent duct. When the vent duct is a pipe, the constriction may be provided by a perforated cap fitted to the upper end of the pipe.

Experiments show that the outlet aperture is preferably substantially circular with a diameter in the range of 1 to 1.5 mm. The outlet aperture may also be provided in a plug which is fitted in an opening in an or the annular bottom wall connecting the lower ends of the inner and outer walls. This plug may have a body part projecting upwardly into the reservoir and fitted with a filter. Also it may be provided with downwardly projecting lugs to inhibit accidental contact with the aperture.

Also for the purpose of avoiding possible clogging of the outlet aperture by contaminated water in the tray, in equilibrium conditions with the lower end of the vent duct just sealed by water in the tray, the outlet aperture may be spaced above the water level in the tray. Surprisingly this may be achieved by providing the lower end of the outlet aperture and the lower end of the vent duct at substantially the same level. This is because as the vacuum in the reservoir is relieved, and water dribbles out of the bottom of the vent duct, it eventually bridges the small gap between the lower end of the vent duct and the water in the tray and surface tension causes the water to seal the lower end of the vent duct while the water level in the rest of the tray is actually slightly below the lower end of the vent duct.

The water inlet means may comprise a cage which closes the bottom of the pot and contains a sponge which, in use, and under equilibrium conditions, will be in contact with the water in the tray.

It is important that sufficient water is drawn into the growing medium in the pot, without the whole of the growing medium being saturated and hence providing too much moisture for good plant growth. Experiments show that this problem can be overcome if the inner wall is stepped to provide a lower pot part with a cross-sectional area of no more than 8 cm² and an upper pot part of larger cross-sectional area, the interface between the two parts of the pot occurring at least 3 cm above the normal water level in the tray.

An example of a container constructed in accordance with the present invention is illustrated in the accompanying drawings, in which:

FIG. 3A is a plan of a vent pipe plug;

FIG. 3B is a central axial section through the plug;

Figure 7A:
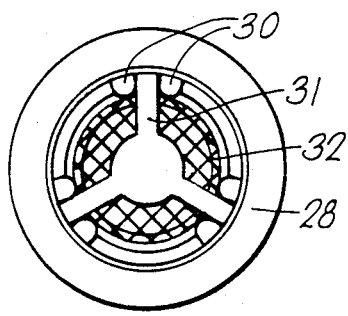
Figure 7B:
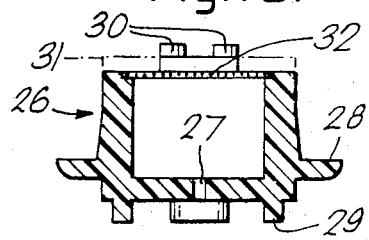
Figure 7C:
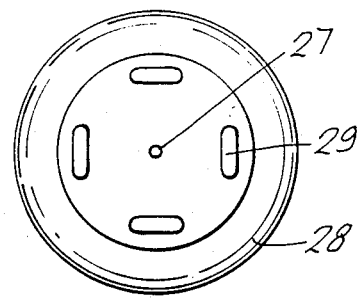

FIGS. 4A and 4B, 5A and 5B, and 6A and 6B are views similar to FIGS. 3A and 3B respectively, but of three further air pipe plugs; and, FIGS. 7A, 7B and 7C are a plan, an axial section, and an underneath plan, respectively, of an outlet aperture plug.

Although the container could be made of other materials such as china, glass or metal, the main component parts of the illustrated container are all moulded from rigid plastics material and consist of an annular inner wall 8, which forms a pot and is closed at its lower end by a perforated cage 9, an annular outer wall 10 formed integrally with an annular bottom wall 11, and a tray 12. The upper ends of the inner wall 8 and outer wall 10 are fused together at beads 13 and the lower end of the inner wall 8 is fused to the inner edge of the bottom wall 11 at a seating 14. This defines between the walls 8, 10 and 11 a water reservoir 15. This reservoir can be filled through a filling opening 16, which is integrally moulded with the inner wall 8, and which may be hermetically sealed by means of screw cap 17. Alternatively, a push-in stopper could be used instead of the cap 17.

A pipe 18 forms a vent duct for the reservoir 15. A lower end of the pipe 18 is a tight fit over a spigot 19 of a plug 20 which is a tight push fit up through an opening in the bottom wall 11, and may be bonded in place. The plug has a flange 21 which engages the bottom of the wall 11 and is tubular, presenting a constricted passageway 22. The passageway may take up a variety of forms as shown in FIGS. 3 to 6. Thus in FIG. 3 the passageway 22 is circular and has, in cross-section, two diametrically opposed narrow lateral projections 23. The central primary cross-sectional area portion of the passageway 22 is for the up flow of air, and the secondary cross-sectional areas 23 are for the drainage of water.

In the FIG. 4 example the passageway 22 is of square cross-section and the corners act like the secondary cross-sectional areas 23 in the FIG. 3 example.

The FIG. 5 plug is very similar to that of FIG. 3.

The FIG. 6 plug differs in that the secondary cross-sectional areas 23 are separate from the primary cross-sectional area 22 for air flow, and are formed by small holes within an integral inner wall of the plug.

The internal diameter of the pipe 18 is 11 mm and the primary cross-sectional area portion of the passageway 22 has a breadth/diameter of between 5 and 7 mm.

The upper end of the vent pipe 18 has fitted tightly over it, and possibly bonded to it, a cap 24 formed with perforations 25.

A second plug 26 is also a tight fit in an opening in the bottom wall 11, and may be bonded in the opening. The plug is provided with an outlet aperture 27 for water to pass from the reservoir 15 into the tray 12. As shown more clearly in FIG. 7, the plug has an annular flange 28, which abuts the bottom of the wall 11, and four equiangularly spaced downwardly projecting integral lugs 29, which give a measure of protection against touching the bottom of the aperture 27. At its upper end within the reservoir the plug is provided with three equiangularly spaced pairs of nibs 30 which receive as a snap fit the respective arms of a retainer 31, which overlies, and holds seated within the top of the plug 26, a filter disk 32.

Figure 1:
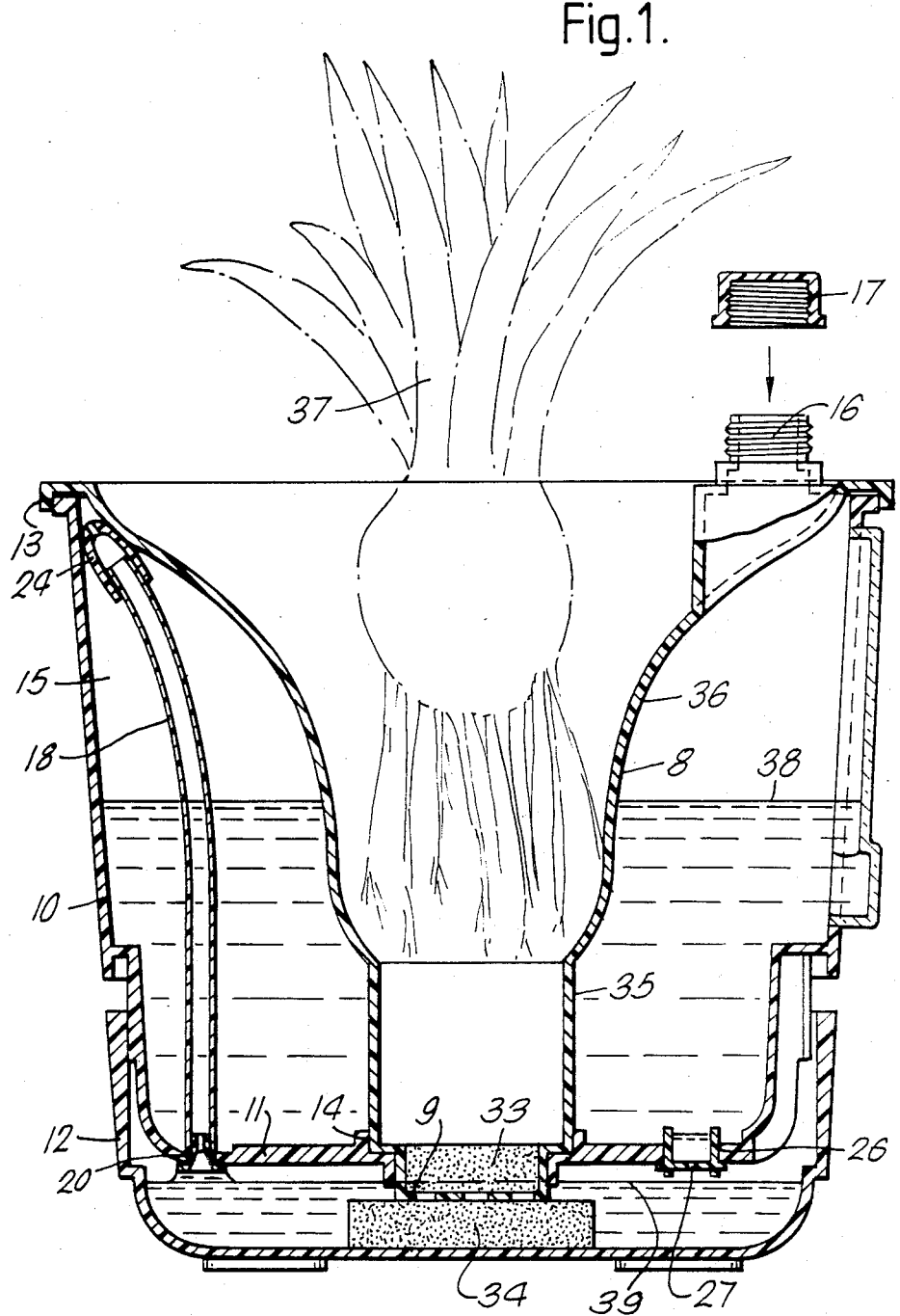
FIG. 1 is a central vertical section.
Figure 2:
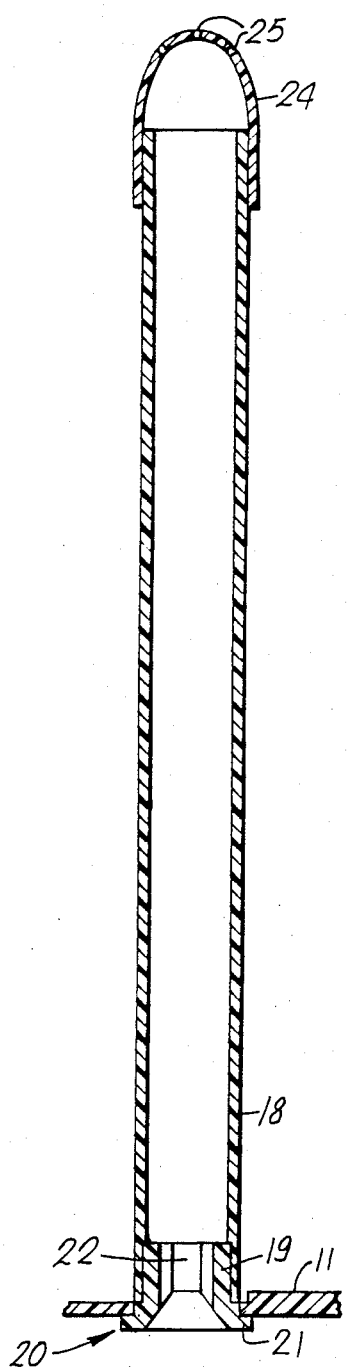
FIG. 2 is a section through a vent pipe and associated pipes.

The cage portion 9 of the pot contains a compressed sponge 33 and a spare uncompressed sponge 34 is shown within the tray. The sponge 33 can absorb water from the tray through the perforations in the bottom of the cage 9 under equilibrium conditions at which the water level 39 is as shown in FIG. 1. In this condition the outlet aperture 27 is spaced slightly above the water level in the tray but the lower end of the vent pipe 18 is sealed by the surface tension of the water clinging to the edge of the flange 21 of the plug 20.

The pot 8 has a lower cylindrical portion 35 which defines a lower part having a diameter of 3 cm and a similar height. The sponge 33 has a height of about 1.5 cm.

The pot 8 is stepped outwardly at the upper end of the portion 35 to provide an upper part 36 of greater cross-sectional area than the lower part. As a result, and as suggested in FIG. 1, a growing plant 37 will normally have its root system within the upper pot part which receives adequate moisture from the soil in the lower pot part, without becoming undesirably saturated.

FIG. 1 shows the equilibrium condition in which a partial vacuum above water level 38 in the reservoir 15, prevents further water from dripping into the tray through the outlet aperture 27. However, when the water level 39 in the tray is depleted, either by virtue of having been drawn into the pot, of as a result of evaporation, the water seal at the bottom of the vent pipe 18 is broken and bubbles of air rise through the water in the pipe to relieve the partial vacuum and allow water to drip out of the reservoir through the aperture 27 to replenish the level of water in the tray. No water is forced out of the top of the vent pipe 18 into reservoir owing, primarily, to the constricted passageway through the plug 20, which causes the air to rise in a stream of very small bubbles, each smaller in diameter than the internal diameter of the pipe 18. The perforated cap 24 also contributes to slowing down the air flow into the pipe 18. At the same time, water dribbles down through the secondary cross-sectional area portions 23 of the passageway through the plug 20 and ultimately these drops bridge between the flange 21 and the plug and the water in the tray, and surface tension completes the water seal around the plug, so that the vent pipe 18 is again sealed. Water then ceases to pass through the aperture 27 into the tray and the equilibrium conditions are restablished.

I claim:

1. A plant container comprising an inner wall forming a pot, which is arranged to contain a plant in a growing medium and which has water inlet means adjacent a bottom thereof; an outer wall which surrounds said inner wall to provide therebetween a water reservoir; a dish which is located beneath said walls and which is capable of containing water at least up to the level of said water inlet means of said pot, said reservoir being provided adjacent to a top thereof with a filling opening, which is provided with a removable air-tight closure, and which is provided adjacent to a bottom thereof with an outlet aperture opening into said dish; and a vent duct, a lower end of which opens through said bottom of said reservoir into said dish at a level above said water inlet means of said pot, an upper end of said vent duct opening into an upper part of said reservoir; the arrangement being such that, in use, when the water in said tray is depleted so that said lower end of said vent duct is exposed, air can enter said reservoir through said vent duct and allow water to flow out of said reservoir through said outlet aperture into said tray; wherein there is a constriction adjacent to said lower end of said vent duct having a cross-sectional area smaller than the cross-sectional area of said vent duct to prevent large air bubbles from rising up said vent duct that might force water out of the top of said vent duct into said reservoir; said vent duct being a pipe, a lower end of which is sealed to an opening in an annular bottom wall interconnecting lower ends of said inner and outer walls; said pipe being sealed to said opening in said bottom wall by means of a tubular plug which is fitted in said opening in the bottom wall and has an upwardly projecting spigot over which said lower end of said pipe is fitted, said plug having a passageway providing said constriction.

2. A container according to claim 1, wherein said plug includes a primary cross sectional area passageway for the upward flow of air into said pipe and at least one secondary cross sectional area passageway, smaller than said primary cross sectional area passageway, for the downward flow of water out of said pipe.

3. A container according to claim 2, wherein said primary and secondary cross sectional area passageways are different parts of a common passageway through said plug.

4. A container according to claim 1, wherein said outlet aperture is substantially circular with a diameter in the range of 1 to 1.5 mm.

5. A container according to claim 1, wherein under equilibrium conditions at which said lower end of said vent duct is just sealed off from air by contact with water in said tray, said outlet aperture is spaced above the water level in said tray.

6. A container according to claim 1, wherein said inner wall is stepped to provide a lower pot part with a cross sectional area of no more than 8 cm$^2$ and an upper pot part of larger cross sectional area, an interface between said two parts of said pot occurring at least 3 cm above the normal water level in said tray, said normal water level being that level at which the lower end of the vent duct is just sealed off from air by contact with water in said tray.

7. A plant container comprising an inner wall forming a pot, which is arranged to contain a plant in a growing medium and which has water inlet means adjacent a bottom thereof; an outer wall which surrounds said inner wall to provide therebetween a water reservoir; a dish which is located beneath said walls and which is capable of containing water at least up to the level of said water inlet means of said pot, said reservoir being provided adjacent to a top thereof with a filling opening, which is provided with a removable air-tight closure, and which is provided adjacent to a bottom thereof with an outlet aperture opening into said dish; and a vent duct, a lower end of which opens through said bottom of said reservoir into said dish at a level above said water inlet means of said pot, an upper end of said vent duct opening into an upper part of said reservoir; the arrangement being such that, in use, when the water in said tray is depleted so that said lower end of said vent duct is exposed, air can enter said reservoir through said vent duct and allow water to flow out of said reservoir through said outlet aperture into said tray; wherein there is a constriction adjacent to said lower end of said vent duct having a cross-sectional area smaller than the cross-sectional area of said vent duct to prevent large air bubbles from rising up said vent duct that might force water out of the top of said vent duct into said reservoir; said vent duct upper end also having a constriction therein.

8. A container according to claim 7 wherein said constriction at said upper end of the pipe is provided by a perforated cap fitted to said upper end of the pipe.

9. A plant container comprising an inner wall forming a pot, which is arranged to contain a plant in a growing medium and which has water inlet means adjacent a bottom thereof; an outer wall which surrounds said inner wall to provide therebetween a water reservoir; a dish which is located beneath said walls and which is capable of containing water at least up to the level of said water inlet means of said pot, said reservoir being provided adjacent to a top thereof with a filling opening, which is provided with a removable air-tight closure, and which is provided adjacent to a bottom thereof with an outlet aperture opening into said dish; and a vent duct, a lower end of which opens through said bottom of said reservoir into said dish at a level above said water inlet means of said pot, an upper end of said vent duct opening into an upper part of said reservoir; the arrangement being such that, in use, when the water in said tray is depleted so that said lower end of said vent duct is exposed, air can enter said reservoir through said vent duct and allow water to flow out of said reservoir through said outlet aperture into said tray; wherein there is a constriction adjacent to said lower end of said vent duct having a cross-sectional area smaller than the cross-sectional area of said vent duct to prevent large air bubbles from rising up said vent duct that might force water out of the top of said vent duct into said reservoir; said outlet aperture being provided with a plug which is fitted in an opening in an annular bottom wall connecting lower ends of said inner and outer walls.

10. A container according to claim 9, wherein said plug has lugs disposed around said aperture, said lugs extending below the level of said aperture.

11. A container according to claim 9, wherein said plug has a body part projecting upwardly into said reservoir and said body part is fitted with a filter.

12. A plant container comprising an inner wall forming a pot, which is arranged to contain a plant in a growing medium and which has water inlet means adjacent a bottom thereof; an outer wall which surrounds said inner wall to provide therebetween a water reservoir; a dish which is located beneath said walls and which is capable of containing water at least up to the level of said water inlet means of said pot, said reservoir being provided adjacent to a top thereof with a filling opening, which is provided with a removable air-tight closure, and which is provided adjacent to a bottom thereof with an outlet aperture opening into said dish; and a vent duct, a lower end of which opens through said bottom of said reservoir into said dish at a level above said water inlet means of said pot, an upper end of said vent duct opening into an upper part of said reservoir; the arrangement being such that, in use, when the water in said tray is depleted so that said lower end of said vent duct is exposed, air can enter said reservoir through said vent duct and allow water to flow out of said reservoir through said outlet aperture into said tray; wherein there is a constriction adjacent to said lower end of said vent duct having a cross-sectional area smaller than the cross-sectional area of said vent duct to prevent large air bubbles from rising up said vent duct that might force water out of the top of said vent duct into said reservoir; said water inlet means comprising a cage which closes a bottom of said pot and contains a sponge which, in use, and under equilibrium conditions at which the lower end of said vent duct is just sealed off from air by water in said tray, will be in contact with the water in said tray.

13. A plant container comprising an inner wall forming a pot, which is arranged to contain a plant in a growing medium and which has water inlet means adjacent a bottom thereof; an outer wall which surrounds said inner wall to provide therebetween a water reservoir; a dish which is located beneath said walls and which is capable of containing water at least up to the level of said water inlet means of said pot, said reservoir being provided adjacent to a top thereof with a filling opening, which is provided with a removable air-tight closure, and which is provided adjacent to a bottom thereof with an outlet aperture opening into said dish; and a vent duct, a lower end of which opens through said bottom of said reservoir into said dish at a level above said water inlet means of said pot, an upper end of said vent duct opening into an upper part of said reservoir; the arrangement being such that, in use, when the water in said tray is depleted so that said lower end of said vent duct is exposed, air can enter said reservoir through said vent duct and allow water to flow out of said reservoir through said outlet aperture into said tray; wherein there is a constriction adjacent to said lower end of said vent duct having a cross-sectional area smaller than the cross-sectional area of said vent duct to prevent large air bubbles from rising up said vent duct that might force water out of the top of said vent duct into said reservoir; said vent duct being a pipe, a lower end of which is sealed to an opening in an annular bottom wall interconnecting lower ends of said inner and outer walls; said vent duct upper end also having a constriction therein.

14. A container according to claim 13 wherein said constriction at said upper end of the vent duct is provided by a perforated cap fitted to said upper end of the vent duct.

15. A container according to claim 13 wherein said constriction at said upper end of the pipe is provided by a perforated cap fitted to said upper end of the pipe.

* * * * *